United States Patent [19]

Greenall et al.

[11] 4,222,935

[45] Sep. 16, 1980

[54] PROCESS FOR THE MANUFACTURE OF AROMATIC NITRILES

[75] Inventors: Antony Greenall; Raymond Price; Peter M. Quan, all of Manchester, England

[73] Assignee: Imperial Chemical Industries Limited, London, England

[21] Appl. No.: 62,224

[22] Filed: Jul. 27, 1979

[30] Foreign Application Priority Data

Aug. 7, 1978 [GB] United Kingdom ............... 32469/78

[51] Int. Cl.² ...................... C07C 120/00; C09B 43/00
[52] U.S. Cl. ..................................... 260/205; 260/206; 260/207; 260/207.1; 260/207.5; 260/208; 260/465 R; 260/465 B
[58] Field of Search ............... 260/465 R, 465 B, 205, 260/206, 207, 207.1, 207.5, 208

[56] References Cited

U.S. PATENT DOCUMENTS

| | | | |
|---|---|---|---|
| 2,042,451 | 6/1936 | Bond et al. ........................... | 423/373 |
| 2,429,262 | 10/1947 | Fallows et al. ...................... | 423/373 |
| 3,417,124 | 12/1968 | Rohll et al. ....................... | 260/465 B |
| 3,968,099 | 7/1976 | Leverenz ........................... | 260/208 |

OTHER PUBLICATIONS

Deschamps, Chemical Abstracts, vol. 25, 3620 (1931).
Hatano et al., Chemical Abstracts, vol. 51, 10015g (1957).

*Primary Examiner*—Dolph H. Torrence
*Attorney, Agent, or Firm*—Cushman, Darby & Cushman

[57] ABSTRACT

A process for the manufacture of aromatic nitriles by reacting an aromatic halogen compound with formamide and the anhydride of a monocarboxylic acid in the presence of a copper catalyst and an acid-binding agent. Particularly applicable to replacement of halogen ortho to the azo linkage of an azo dyestuff by cyano.

9 Claims, No Drawings

PROCESS FOR THE MANUFACTURE OF AROMATIC NITRILES

This invention relates to a chemical process and more particularly to a process for the manufacture of aromatic nitriles.

A number of methods for the preparation of aromatic nitriles is known, but particularly useful is the replacement of an aryl halogen atom by the cyano group, for example, by the action of cuprous cyanide at an elevated temperature, with or without an organic base (e.g. pyridine) as a promoter or solvent.

However, this method has the disadvantage that it involves the preparation and handling of a metal cyanide, with consequent toxicity and effluent disposal problems.

It has now been found that an aryl halogen atom can be replaced by the cyano group without the use of cyanide group-containing intermediates.

According to the present invention there is provided a process for the manufacture of aromatic nitriles which comprises reacting an aromatic halide which is a chlorine, bromine or iodine compound with formamide and the anhydride of a monocarboxylic acid in the presence of a copper catalyst and an acid-binding agent.

The amounts of formamide and carboxylic acid anhydride which are used may be from 2 to 20 mols per mol of the aromatic halide. It is preferred to use approximately 4 mols of each of these reactants per mol of the aromatic halide.

The acid-binding agent may be used in an amount of 2 to 10, preferably approximately 3 mols, per mol of the aromatic halide.

The copper catalyst may be used in an amount of 0.01 to 1.0 mols, preferably 0.1 mole, per mol of the aromatic halide.

Examples of the anhydrides of monocarboxylic acids which may be used in the above process are acetic anhydride, propionic anhydride and benzoic anhydride.

Examples of the copper catalysts which may be used are metallic copper, copper (I) chloride, copper (I) bromide, copper (I) iodide, copper (II) chloride and copper (II) acetate. The preferred catalyst is copper (I) iodide. Metallic copper may be used in the form of, for example, wire or copper bronze.

Examples of the acid-binding agents which may be used are sodium acetate, potassium acetate, sodium benzoate, sodium carbonate and sodium hydroxide. Organic acid-binding agents, for example, imidazole, pyridine and triethylamine may also be used but are less effective.

The reaction is preferably carried out in the presence of a non-hydroxylic solvent, for example, n-butyl acetate, iso-butyl acetate or nitrobenzene. The amount of solvent which is used is not critical, but should be sufficient to ensure that the reaction mixture is readily stirrable.

A reaction temperature of at least 75° C. is necessary for the reaction to proceed at an acceptable rate, and temperatures from 75° to 120° C. are generally satisfactory.

The reaction may be applied, for example, to the replacement of the aromatic halogen atom or atoms by the cyano group in a compound of the structure:

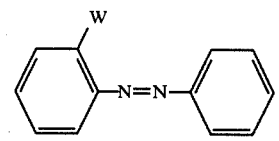

wherein W represents a chlorine, bromine or iodine atom and in which the aromatic nuclei may carry other substituents including chlorine, bromine or iodine atoms ortho to the azo linkage.

Thus, the reaction is particularly useful when applied to azo dyestuffs. For example, in the case in which the aromatic halogen compound is an azo dyestuff of the formula:

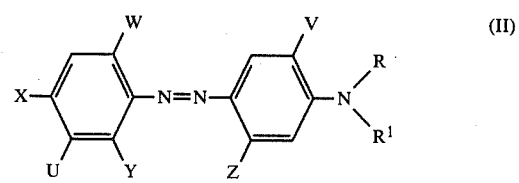

wherein

X and Y each independently represent a hydrogen atom, a halogen atom or a lower alkyl, lower alkoxy, cyano, nitro, sulphone, optionally substituted sulphamoyl, optionally substituted carbamoyl or alkoxycarbonyl group;

Z represents a hydrogen atom or a lower alkyl, lower alkoxy, lower alkylamino or $NR^2CO.T$ group in which $R^2$ represents a hydrogen atom or a lower alkyl group and T represents a hydrocarbon radical, an amino group or a group —NHQ or —OQ in which Q represents a hydrocarbon radical;

U represents a hydrogen atom, a halogen atom or a lower alkyl, lower alkoxy, sulphone or nitro group, provided that U is not a sulphone or nitro group when either of X and Y is a nitro, sulphone or optionally substituted sulphamoyl group;

V represents a hydrogen atom, a halogen atom or a lower alkyl or lower alkoxy group;

R represents a hydrogen atom or an optionally substituted hydrocarbon group;

$R^1$ represents an optionally substituted hydrocarbon group; and

W represents a chlorine, bromine or iodine atom, the latter is replaced by the cyano group when the azo dyestuff is reacted with formamide and the anhydride of a monocarboxylic acid in the presence of a copper catalyst and an acid-binding agent according to the process of the present invention. If Y is also a chlorine, bromine or iodine atom this too may be replaced by cyano.

With reference to the above-defined formula (II):

Examples of the lower alkyl groups represented by $R^2$, X, Y, Z, U and V are methyl, ethyl, n-propyl, iso-propyl and n-butyl.

Examples of the lower alkoxy groups represented by X, Y, Z, U and V are methoxy and ethoxy.

Examples of the hydrocarbon radicals represented by T and Q are aryl radicals, preferably the phenyl radical, and alkyl radicals, preferably lower alkyl radicals and particularly the methyl or ethyl radical.

An example of a lower alkylamino radical represented by Z is the methylamino radical.

Examples of the halogen atoms represented by X, Y, U and V are chlorine and bromine atoms.

Examples of sulphone groups represented by X, Y and U are methylsulphonyl and ethylsulphonyl.

Examples of substituted sulphamoyl groups represented by X and Y are N-methylaminosulphonyl, N,N-dimethylaminosulphonyl, N-ethylaminosulphonyl and N,N-diethylaminosulphonyl.

Examples of substituted carbamoyl groups represented by X and Y are N-methylaminocarbonyl, N,N-dimethylaminocarbonyl, N-ethylaminocarbonyl and N,N-diethylaminocarbonyl.

The alkoxycarbonyl groups represented by X and Y are preferably lower alkoxycarbonyl groups, examples of which are methoxycarbonyl, ethoxycarbonyl and n-butoxycarbonyl.

The optionally substituted hydrocarbon groups represented by R and $R^1$ may be optionally substituted alkyl, cycloalkyl, aralkyl or aryl groups. It is preferred that R and $R^1$ are optionally substituted alkyl groups and especially optionally substituted lower alkyl groups.

Examples of optionally substituted hydrocarbon groups represented by R and $R^1$ are methyl, ethyl, n-propyl, iso-propyl, n-butyl, cyclohexyl, benzyl, β-phenylethyl, phenyl, 2-hydroxyethyl, 2-acetoxyethyl, 2-(methoxycarbonyl)ethyl and 2-(ethoxycarbonyl)ethyl.

In this specification the terms "lower alkyl" and "lower alkoxy" mean alkyl and alkoxy groups respectively which contain from 1 to 4 carbon atoms.

Preferred conditions for the conversion of an azo compound of formula (II) in which W is bromine into the corresponding compound in which W is cyano involve the reaction of 1 mol of (II) (W=Br), 4 mols of formamide, 4 mols of acetic anhydride, 3 mols of anhydrous sodium acetate and 0.1 mole of copper (I) iodide in approximately 20 mols of n-butyl acetate as solvent, the mixture being stirred at approximately 110° C. until the reaction is complete. The reaction time if from 30 minutes to 24 hours depending upon the substituents which are present in the azo compound of formula (II). The product (II) (W=CN) is obtained essentially free from by products and usually does not require purification. Yields of 90% or even higher may be obtained.

The o-cyanoazo compounds obtained by the process of the present invention are dyestuffs useful for the colouration of synthetic textile materials, especially aromatic polyester textile materials. The dyestuffs in the form of aqueous dispersions may be applied to such textile materials by dyeing, padding or printing methods and give orange to violet shades.

The invention is illustrated but not limited by the following Examples in which parts and percentages are by weight.

EXAMPLE 1

2-Bromo-4,6-dinitro-2'-acetylamino-4'-(N,N-diethylamino) azobenzene (479 parts), copper (I) iodide (19 parts), anhydrous sodium acetate (246 parts), formamide (180 parts), acetic anhydride (408 parts) and n-butyl acetate (2190 parts) are mixed together and heated, with stirring, to 110° C. during 15 minutes. The temperature is maintained at 110° for 30 to 50 minutes, when a solid is suddenly precipitated from the reaction mixture, indicating completion of the reaction. The mixture is allowed to cool to room temperature and the product is collected, washed with ethanol to remove residual n-butyl acetate and dried. 2-Cyano-4,6-dinitro-2'-acetylamino-4'-(N,N-diethylamino)azobenzene is obtained in 88% yield and requires no purification.

The structure of the compound was confirmed by the identity of its n.m.r. spectrum with that of authentic material.

EXAMPLE 2

2-Bromo-4-nitro-4'-(N,N-diethylamino)azobenzene (1.9 parts), copper (I) iodide (0.95 parts), anhydrous sodium acetate (1.2 parts), formamide (1.8 parts), acetic anhydride (2.0 parts) and n-butyl acetate (44 parts) are mixed together and heated, with stirring, to 110° C. during 15 minutes. The temperatures is maintained at 110° C. for 3½ hours when reaction is adjudged complete by thin layer chromatography. The solvent is removed at 80° C. under reduced pressure and the residue is slurried in water (250 parts), collected and dried. 2-Cyano-4-nitro-4'-(N,N-diethylamino)azobenzene is obtained in 75% yield and requires no purification.

When the 1.9 parts of 2-bromo-4-nitro-4'-(N,N-diethylamino) azobenzene employed in Example 2 are replaced by an equivalent amount of one of the azo compounds listed in Table 1, the corresponding o-cyanodiarylazo compound is obtained. The symbols W, X, U, Y, Z, V, R and $R^1$ in Table 1 have the same significance as in the foregoing Formula II. The shade obtained when an aqueous dispersion of the dyestuff is applied to aromatic polyester textile material is given in the final column of the table.

In the case of Examples 16 to 18, both bromine atoms ortho to the azo linkage are replaced by cyano.

Table 1

| Example No. | W | X | Cl | Y | Z | V | R | $R^1$ | Shade |
| --- | --- | --- | --- | --- | --- | --- | --- | --- | --- |
| 3 | Cl | $NO_2$ | H | $NO_2$ | $NHCOCH_3$ | H | $C_2H_5$ | $C_2H_5$ | Blue |
| 4 | Br | $NO_2$ | H | $NO_2$ | H | H | $C_2H_5$ | $C_2H_5$ | Blue |
| 5 | Br | $NO_2$ | H | $NO_2$ | $NHCOCH_3$ | H | $C_2H_5$ | $C_2H_5$ | Blue |
| 6 | Br | $NO_2$ | H | $NO_2$ | $N(CH_3)(COCH_3)$ | H | $C_2H_5$ | $C_2H_5$ | Blue |
| 7 | Br | $NO_2$ | H | $NO_2$ | $NHCH_3$ | H | $C_2H_5$ | $C_2H_5$ | Blue |
| 8 | Br | $NO_2$ | H | H | $NHCOCH_3$ | H | $C_2H_5$ | $C_2H_5$ | Violet |
| 9 | Br | $NO_2$ | H | H | $N(CH_3)(COCH_3)$ | H | $C_2H_5$ | $C_2H_5$ | Violet |
| 10 | Br | H | $NO_2$ | H | H | H | $C_2H_5$ | $C_2H_5$ | Red |
| 11 | Br | H | $NO_2$ | H | $NHCOCH_3$ | H | $C_2H_5$ | $C_2H_5$ | Bluish-red |
| 12 | Br | H | $NO_2$ | H | $N(CH_3)(COCH_3)$ | H | $C_2H_5$ | $C_2H_5$ | Bluish-red |
| 13 | Br | H | H | H | H | H | $C_2H_5$ | $C_2H_5$ | Orange |
| 14 | Br | H | H | H | $NHCOCH_3$ | H | $C_2H_5$ | $C_2H_5$ | Orange |
| 15 | Br | H | H | H | $N(CH_3)(COCH_3)$ | H | $C_2H_5$ | $C_2H_5$ | Orange |
| 16 | Br | $NO_2$ | H | Br | H | H | $C_2H_5$ | $C_2H_5$ | Blue |
| 17 | Br | $NO_2$ | H | Br | $NHCOCH_3$ | H | $C_2H_5$ | $C_2H_5$ | Blue |
| 18 | Br | $NO_2$ | H | Br | $N(CH_3)(COCH_3)$ | H | $C_2H_5$ | $C_2H_5$ | Blue |
| 19 | Br | $CH_3$ | H | $NO_2$ | $NHCOCH_3$ | H | $C_2H_5$ | $C_2H_5$ | Rubine |

Table 1-continued

| Example No. | W | X | Cl | Y | Z | V | R | R¹ | Shade |
|---|---|---|---|---|---|---|---|---|---|
| 20 | Br | CH₃ | H | H | NHCOCH₃ | H | C₂H₅ | C₂H₅ | Orange |
| 21 | Br | NO₂ | H | H | H | H | C₂H₄OCOCH₃ | C₂H₄OCOCH₃ | Rubine |
| 22 | Br | NO₂ | H | H | CH₃ | H | C₂H₄OCOCH₃ | C₂H₄OCOCH₃ | Rubine |

EXAMPLE 23

2-Bromo-4,6-dinitro-2'-acetylamino-4'-(N,N-diethylamino)azobenzene (2.4 parts), copper (I) iodide (0.95 parts), anhydrous sodium acetate (1.2 parts), formamide (1.8 parts), propionic anhydride (2.6 parts) and n-butyl acetate (44 parts) are mixed together are heated, with stirring, to 110° C. during 15 minutes. The temperature is maintained for 30 minutes when reaction is adjudged complete by thin layer chromatography. The mixture is cooled to room temperature and poured into petroleum ether (boiling range 60-80° C.) (400 parts). The precipitate is collected, washed with petroleum ether (100 parts) and dried. 2-cyano-4,6-dinitro-2'-acetylamino-4'-(N,N-diethylamino)azobenzene is obtained in 83.5% yield.

EXAMPLE 24

When the 2.6 parts of propionic anhydride employed in Example 23 are replaced by 4.3 parts of benzoic anhydride, reaction goes to completion in 10 minutes at 110° C. to give 2-cyano-4,6-dinitro-2'-acetylamino-4'-(N,N-diethylamino) azobenzene in 72% yield.

EXAMPLE 25

2-Bromo-4,6-dinitro-2'-acetylamino-4'-(N,N-diethylamino) azobenzene (2.4 parts), copper (I) iodide (0.95 parts), anhydrous potassium acetate (1.5 parts), formamide (1.8 parts), acetic anhydride (2.0 parts) and n-butyl acetate (44 parts) are mixed together and heated, with stirring, to 110° C. during 15 minutes. The temperature is maintained at 110° C. for 2 hours when reaction is complete. The mixture is cooled to room temperature and poured into petroleum ether (boiling range 60-80° C.) (400 parts). The precipitate is collected, washed with petroleum ether (100 parts) and dried. 2-Cyano-4,6-dinitro-2'-acetylamino-4'-(N,N-diethylamino)azobenzene is obtained in 95% yield.

EXAMPLE 26

When the 1.5 parts of anhydrous potassium acetate employed in Example 25 are replaced by 1.59 parts of anhydrous sodium carbonate, reaction goes to completion in 3 hours at 110° C. to give 2-cyano-4,6-dinitro-2'-acetylamino-4'-(N,N-diethylamino)azobenzene in 71% yield.

EXAMPLE 27

When the 1.5 parts of anhydrous potassium acetate employed in Example 25 are replaced by 1.5 parts of triethylamine, reaction goes to completion after 2½ hours at 110° C.

EXAMPLE 28

2-Bromo-4,6-dinitro-2'-acetylamino-4'-(N,N-diethylamino)azobenzene (2.4 parts), copper (II) chloride (0.67 parts), anhydrous sodium acetate (1.2 parts), formamide (1.8 parts), acetic anhydride (2.0 parts) and n-butyl acetate (44 parts) are mixed together and heated, with stirring, to 110° C. during 15 minutes. The temperature is maintained for 5 hours after which time the reaction is complete. The mixture is cooled to room temperature and poured into petroleum-ether (boiling range 60–80°) (400 parts). The precipitate is collected, washed with petroleum-ether (100 parts) and dried. 2-Cyano-4,6-dinitro-2'-acetylamino-4'-(N,N-diethylamino)azobenzene is obtained in 96% yield.

When the 0.67 parts of copper (II) chloride employed in Example 28 are replaced by an equivalent amount of the copper catalysts listed in column 2 Table 2, 2-cyano-4,6-dinitro-2'-acetylamino-4'-(N,N-diethylamino)azobenzene is obtained in the yields shown in column 4 Table 2.

Table 2

| Example No. | Catalyst | Time (hours) | Yield (%) |
|---|---|---|---|
| 29 | Cu BRONZE | 3 | 66 |
| 30 | Cu WIRE | 3 | 77 |
| 31 | Cu$^I$ Br | 3 | 76 |
| 32 | Cu$^I$ Cl | 3 | 77 |
| 33 | Cu$^I$ I | 1¾ | 92 |
| 34 | (CH₃COO)₂Cu . H₂O | 5 | 78 |
| 35 | CuCN | 5 | 10 |
| 36 | NO CATALYST | 24 | 0 |

EXAMPLE 37

When the 44 parts of n-butyl acetate employed in Example 5 are replaced by 44 parts of iso-butyl acetate, reaction is complete after 2½ hours at 110° C. giving 2-cyano-4,6-dinitro-2'-acetylamino-4'-(N,N-diethylamino)azobenzene in 88% yield.

EXAMPLE 38

When the 44 parts of n-butyl acetate employed in Example 5 are replaced by 60 parts of nitrobenzene, reaction is complete after 1½ hours at 110° C. giving 2-cyano-4,6-dinitro-2'-acetylamino-4'-(N,N-diethylamino)azobenzene in 87% yield.

We claim:

1. A process for the manufacture of aromatic nitriles which comprises reacting an aromatic halide which is a chlorine, bromine or iodine compound with formamide and the anhydride of a monocarboxylic acid in the presence of a copper catalyst and an acid-binding agent.

2. A process as claimed in claim 1 wherein from 2 to 20 mols of formamide and of the carboxylic acid anhydride are used per mol of the aromatic halide.

3. A process as claimed in claim 1 wherein from 2 to 10 mols of acid-binding agent are used per mol of the aromatic halide.

4. A process as claimed in claim 1 wherein from 0.01 to 1.0 mols of copper catalyst are used per mol of the aromatic halide.

5. A process as claimed in claim 1 wherein the copper catalyst is copper (I) iodide.

6. A process as claimed in claim 1 wherein the reaction is carried out in the presence of a non-hydroxylic solvent.

7. A process as claimed in claim 1 wherein the reaction temperature is at least 75°C.

8. A process as claimed in claim 1 wherein the aromatic halogen compound is an azo dyestuff.

9. A process as claimed in claim 8 wherein the azo dyestuff has the formula:

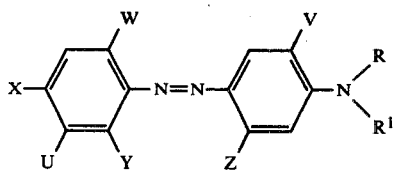

wherein

X and Y each individually represent a hydrogen atom, a halogen atom, or a lower alkyl, lower alkoxy, cyano, nitro, sulphone, optionally substituted sulphamoyl optionally substituted carbamoyl or alkoxycarbonyl group;

Z represents a hydrogen atom or a lower alkyl, lower alkoxy, lower alkylamino or —$NR^2CO.T$ group in which $R^2$ represents a hydrogen atom or a lower alkyl group and T represents a hydrocarbon radical, an amino group or a group —NHQ or —OQ in which Q represents a hydrocarbon radical;

U represents a hydrogen atom, a halogen atom or a lower alkyl, lower alkoxy, sulphone or nitro group, provided that U is not a sulphone or nitro group when either of X and Y is a nitro, sulphone or optionally substituted sulphamoyl group;

V represents a hydrogen atom, a halogen atom or a lower alkyl or lower alkoxy group;

R represents a hydrogen atom or an optionally substituted hydrocarbon radical;

$R^1$ represents an optionally substituted hydrocarbon radical; and

W represents a chlorine, bromine or iodine atom.

* * * * *